(12) United States Patent
Harada et al.

(10) Patent No.: US 7,494,723 B2
(45) Date of Patent: Feb. 24, 2009

(54) $Y_2O_3$ SPRAY-COATED MEMBER AND PRODUCTION METHOD THEREOF

(75) Inventors: Yoshio Harada, Hyogo (JP); Takema Teratani, Hyogo (JP)

(73) Assignee: Tocalo Co., Ltd., Hyogo (JP)

( * ) Notice: Subject to any disclaimer, the term of this patent is extended or adjusted under 35 U.S.C. 154(b) by 80 days.

(21) Appl. No.: 10/560,522

(22) PCT Filed: Jul. 29, 2005

(86) PCT No.: PCT/JP2005/014356
§ 371 (c)(1),
(2), (4) Date: Dec. 13, 2005

(87) PCT Pub. No.: WO2007/013184
PCT Pub. Date: Feb. 1, 2007

(65) Prior Publication Data
US 2007/0026246 A1    Feb. 1, 2007

(51) Int. Cl.
B32B 19/04 (2006.01)
B05D 3/04 (2006.01)
B05D 3/06 (2006.01)
B05D 1/36 (2006.01)
C23C 4/08 (2006.01)
C23C 4/10 (2006.01)

(52) U.S. Cl. ............... 428/701; 427/551; 427/454; 427/559; 427/456; 427/453

(58) Field of Classification Search .......... 428/702; 427/551
See application file for complete search history.

(56) References Cited

U.S. PATENT DOCUMENTS 5,004,712 A * 4/1991 Borglum .................. 264/2.1
5,057,335 A * 10/1991 Hanagata et al. ............ 427/512
5,316,859 A   5/1994 Harada et al.
5,397,650 A   3/1995 Harada et al.

(Continued)

FOREIGN PATENT DOCUMENTS

JP          59-096273        6/1984

(Continued)

OTHER PUBLICATIONS

Materials Research Bulletin vol. 16, Issue 4, Apr. 1981, pp. 453-459.*

(Continued)

Primary Examiner—Carol Chaney
Assistant Examiner—Nicole T Gugliotta
(74) Attorney, Agent, or Firm—Greenblum & Bernstein, P.L.C.

(57) ABSTRACT

A member is obtained by forming a $Y_2O_3$ black spray coating on a surface of a substrate or covering the surface of the substrate with a $Y_2O_3$ black spray coating through an undercoat or a middle layer. This coating has good heat characteristics and is good in the resistance to damaging through a high hardness. The $Y_2O_3$ black spray coating is produced by subjecting white $Y_2O_3$ powdery material to a plasma spraying in an inert gas atmosphere containing substantially no oxygen or by forming a $Y_2O_3$ white spray coating and then irradiating an electron beam or a laser beam to this coating to melt at least a part of the white coating under heating to thereby smoothen denseness and blacken the surface of the coating.

15 Claims, 1 Drawing Sheet

(1) White $Y_2O_3$ spray coating according to the conventional technique
(2) Black $Y_2O_3$ spray coating according to the invention

U.S. PATENT DOCUMENTS

| | | | |
|---|---|---|---|
| 5,472,793 | A | 12/1995 | Harada et al. |
| 6,132,890 | A | 10/2000 | Harada et al. |
| 6,180,259 | B1 | 1/2001 | Harada et al. |
| 6,306,489 | B1 | 10/2001 | Hellmann et al. |
| 6,326,063 | B1 | 12/2001 | Harada et al. |
| 6,383,964 | B1 | 5/2002 | Nakahara et al. |
| 6,783,863 | B2 | 8/2004 | Harada et al. |
| 6,852,433 | B2 * | 2/2005 | Maeda ............... 428/697 |
| 6,884,516 | B2 | 4/2005 | Harada et al. |
| 2002/0177001 | A1 | 11/2002 | Harada et al. |
| 2005/0136188 | A1 | 6/2005 | Chang |
| 2005/0147852 | A1 | 7/2005 | Harada et al. |
| 2006/0099457 | A1 | 5/2006 | Moriya et al. |
| 2007/0054092 | A1 | 3/2007 | Harada et al. |

FOREIGN PATENT DOCUMENTS

| | | | |
|---|---|---|---|
| JP | 59096273 | * | 6/1984 |
| JP | 61-104062 | | 5/1986 |
| JP | 61 113755 | | 5/1986 |
| JP | 10-045467 | | 2/1989 |
| JP | 64-039728 | | 2/1989 |
| JP | 01-139749 | | 6/1989 |
| JP | 03-115535 | | 5/1991 |
| JP | 05-117064 | | 5/1993 |
| JP | 05-238859 | | 9/1993 |
| JP | 06-057396 | | 3/1994 |
| JP | 06-136505 | | 5/1994 |
| JP | 06-142822 | | 5/1994 |
| JP | 06-196421 | | 7/1994 |
| JP | 07-126827 | | 5/1995 |
| JP | 07-176524 | | 7/1995 |
| JP | 08-037180 | | 2/1996 |
| JP | 08-339895 | | 12/1996 |
| JP | 09-069554 | | 3/1997 |
| JP | 09-316624 | | 9/1997 |
| JP | 09-272987 | | 10/1997 |
| JP | 09-327779 | | 12/1997 |
| JP | 10-045461 | | 2/1998 |
| JP | 10-202782 | | 4/1998 |
| JP | 10-004083 | | 6/1998 |
| JP | 10-163180 | | 6/1998 |
| JP | 11-080925 | | 3/1999 |
| JP | 11-207161 | | 8/1999 |
| JP | 2000-054802 | | 2/2000 |
| JP | 2001-31484 | | 2/2001 |
| JP | 2001-031484 | | 2/2001 |
| JP | 2001-164354 | | 6/2001 |
| JP | 2003-321760 | | 11/2003 |
| JP | 2004-3022 | | 1/2004 |
| JP | 2004-010981 | | 1/2004 |
| JP | 2004-149915 | | 5/2004 |
| JP | 2005-256098 | | 9/2005 |
| KR | 2002-0003367 | | 1/2002 |
| WO | 2007/023971 | | 3/2007 |
| WO | 2007/023976 | | 3/2007 |

OTHER PUBLICATIONS

Machine translation for JP 2001-164354.*
English Language Abstract of JP 2001-164354.
English Language Abstract of JP 2004-149915.
English Language Abstract of JP 2005-256098.
English Language Abstract of JP 01-139749.
English Language Abstract of JP 2000-054802.
English Language Abstract of JP 06-196421.
English Language Abstract of JP 10-004083.
English Language Abstract of JP 10-163180.
English Language Abstract of JP 61-104062.
English Language Abstract of JP 09-316624.
English Language Abstract of JP 09-327779.
English Language Abstract of JP 10-202782.
English Language Abstract of JP 64-039728.
English Language Abstract of JP 03-115535.
English Language Abstract of JP 05-117064.
English Language Abstract of JP 05-238859.
English Language Abstract of JP 06-057396.
English Language Abstract of JP 06-136505.
English Language Abstract of JP 06-142822.
English Language Abstract of JP 07-126827.
English Language Abstract of JP 07-176524.
English Language Abstract of JP 08-037180.
English Language Abstract of JP 08-339895.
English Language Abstract of JP 09-069554.
English Language Abstract of JP 09-272987.
English Language Abstract of JP 10-045461.
English Language Abstract of JP 10-045467.
English Language Abstract of JP 11-080925.
English Language Abstract of JP 11-207161.
English Language Abstract of JP 2001-031484.
JIS Using Series, "Spraying Techniques Manual", p. 95 (Oct. 30, 1998), Japanese Standard Association), with English language translation.
English language Abstract of JP 2001-31484.
English Language Abstract of JP 59-096273.
English Language Abstract of JP 2004-010981.
U.S. Appl. No. 11/266,355 to Tsuyoshi Moriya et al., filed Nov. 4, 2005 and entitled "Method of producing ceramic spray-coated member, program for conducting the method, storage medium and ceramic spray-coated member".
U.S. Appl. No. 11/469,051 to Yoshio Harada et al., filed Aug. 31, 2006 and entitled "Spray Coated Member Having an Excellent Resistance to Plasma Erosion and Method of Producing the Same".
U.S. Appl. No. 11/990,755 to Yoshio Harada et al., filed February 21, 2008 and entitled "Spray Coated Member Having Excellent Heat Emission Property and so on and Method of Producing the Same".
U.S. Appl. No. 11/990,760 to Yoshio Harada et al., filed Feb. 21, 2008 and entitled "Spray Coated Member Having Excellent Injury Resistance and so on and Method for Producing the Same".
English language Abstract of JP 2003-321760.
English language Abstract of JP 2004-3022.
English Abstract of JP 61-113755 A published May 31, 1986.

* cited by examiner (1) White $Y_2O_3$ spray coating according to the conventional technique
(2) Black $Y_2O_3$ spray coating according to the invention

$Y_2O_3$ SPRAY-COATED MEMBER AND PRODUCTION METHOD THEREOF

TECHNICAL FIELD

This invention relates to a $Y_2O_3$ spray-coated member having excellent characteristics such as heat radiating property, resistance to damage and the like and a method of producing the same.

BACKGROUND ART

The spraying method is a technique that a coating is formed on a surface of a substrate by melting powder off a metal, a ceramic, a cermet or the like with a plasma or burning flame and then blowing onto the surface of the substrate (a body to be sprayed) under flying, which is one of surface treating techniques widely adopted in many industrial fields. However, the spray coating obtained by laminating fine particles at a molten state is known to cause a large difference in the mechanical strength and corrosion resistance of the coating in accordance with strong and weak bonding force of the particles constituting the coating, amount of particles not bonded and the presence of non-molten particles. For this end, the conventional target of developing the spraying technique lies in that a large moving energy is given to the sprayed particles by using an apparatus for realizing the complete melting of sprayed particles using a high temperature heat source, for example, a plasma jet flame as a heat source, or a high-velocity combustion flame to generate a strong impact energy on the surface of the substrate to be sprayed, whereby the bonding force between the particles is enhanced and the porosity is reduced and further the joining force between the coating and the substrate is improved.

For example, JP-A-1-139749 proposes a method wherein the bonding force between the particles is improved or the oxide film produced on the surface of the metal particle, which is a cause of generating pores, is reduced by adopting a method of spraying a plasma in an argon gas atmosphere of 50-200 hPa.

Recently, the characteristics of the spray coating are improved by the above proposal. However, there is not much the examination on the color of the coating formed by using the same spraying material. As the color of the ceramic spray coating is observed, chromium oxide ($Cr_2O_3$) powder as a spraying material is deep green near to black, but when it is plasma-sprayed, a black coating is obtained. On the other hand, aluminum oxide ($Al_2O_3$) powder is white and also a coating obtained by plasma-spraying is white. On the contrary, titanium oxide ($TiO_2$) powder is whitish, but when it is plasma-sprayed, a blackish coating is obtained. Thus, a cause on the color change of the spray coating is considered due to the fact that a part of oxygen constituting $TiO_2$ disappears in the heat source for spraying to form an oxide shown by $Ti_nO_{2n-1}$ (see JP-A-2000-054802).

As mentioned above, it is general that as to the color of the oxide-based ceramic spray coating getting off a part of oxides, the color of the powder material for spraying itself is reproduced as the color of the coating as it is. For example, yttrium oxide ($Y_2O_3$) usually shows a white color at not only a state of powder material but also a state of a spray coating obtained by spraying likewise $Al_2O_3$. It is considered that even if $Y_2O_3$ is sprayed in a plasma heat source, there is no change in the bonding state between Y and O (oxygen) constituting $Y_2O_3$ particles. That is, it is considered that since Al and Y as a metallic element are very strong in the chemical affinity with oxygen, the oxide does not disappear oxygen even in a high temperature plasma environment, and even after the formation of the spray coating, the characteristics of $Al_2O_3$ or $Y_2O_3$ are maintained as they are.

The $Y_2O_3$ spray coating is excellent in the heat resistance, resistance to high-temperature oxidation and corrosion resistance and develops a remarkable resistance even in a plasma etching environment used in a semiconductor producing apparatus or a working step thereof (resistance to plasma erosion), so that it is a ceramic coating used in many industrial fields (JP-A-6-196421, JP-A-10-004083, JP-A-10-163180, JP 2001-31484A, JP-A-2001-164354).

All of the $Y_2O_3$ spray coatings usually used show a white color and develop some positive effects, but there is no proposal on the change of color in the coating without changing the characteristics of the $Y_2O_3$ spray coating.

As a technique of modifying the surface of the substrate, these is a technique of utilizing an electron beam irradiation or a laser beam irradiation in addition to the above formation of the spray coating. As to the electron beam irradiation, for example, there are known a technique of JP-A-61-104062 wherein electron beams are irradiated to a metal coating to melt the coating to thereby remove the pores, and a technique of JP-A-9-316624 wherein electron beams are irradiated to a carbide cermet coating or a metal coating to improve the performances of the coating.

However, these conventional techniques are a technique of targeting the carbide cermet coating and the metal coating and for the purpose of the disappearance of pores in the coating and the improvement of the adhesion property. Particularly, these techniques are not a technique of adjusting the color of ceramic spray coating, particularly $Y_2O_3$ spray coating.

Further, these techniques are considered to be due to a fixed concept that an electrically conductive coating is required in the treatment of the spraying material with the electron beams as disclosed on paragraph [0011] of JP-A-9-316624. On the other hand, JP-A-9-327779, JP-A-10-202782 and the like disclose the technique of irradiating the laser beams to the spray coating. However, this technique frequently targets the ceramic coating such as metal coating, carbide cermet and the like. In this technique, however, even if the underground is the ceramic coating, the object of the treatment is to disappear the pores of the coating or to promote the occurrence of longitudinal crack utilizing a phenomenon that the coating shrinks in the cooling step after the melting of the coating, and the ceramic coating to be targeted is $ZrO_2$ system.

DISCLOSURE OF THE INVENTION

It is an object of the invention to solve the aforementioned problems of the conventional techniques. That is, the invention proposes a technique that a black spray coating of $Y_2O_3$ is formed on a surface of a substrate instead of a white $Y_2O_3$ spray coating.

As long as it is possible to blacken $Y_2O_3$ spray coating, even if a product provided with such a coating is subjected to a mechanical working such as surface polishing, a given black gloss can be always maintained and a commercial value can be increased. If a black color of a new surface is insufficient after the black coating is removed by the mechanical polishing, it is possible to again blacken the new surface. Further, the black coating hardly shows the dirt as compared with the white coating and can reduce the washing number of a spray coating when being used as a member for a semiconductor working device, so that the productivity is not lowered. Moreover, the black coating is excellent in the heat absorbing ability and a radiation ability of a far infrared ray, so that it is considered that it is excellent in the improvement of heat exchanging property of heat radiation, heat receiving or the like and the resistance to environment.

In the invention, the following technical problems, which can not be solved in the $Y_2O_3$ white spray coating, can be solved by forming the $Y_2O_3$ black spray coating on the surface of the substrate.

(1) In the invention, the $Y_2O_3$ white spray coating is blackened without obstructing the properties inherent thereto, so that the resulting coating can be used in the same applications as in the white coating.

(2) In the invention, the $Y_2O_3$ spray coating becomes black, so that the coating product hardly shows the dirt and it is useless to repeatedly conduct the washing beyond necessity.

(3) In the invention, the $Y_2O_3$ spray coating indicates a black color, so that when this coating is formed on a heat radiation face or a heat receiving face, the heat radiation efficiency or heat receiving efficiency is improved to improve the performances of the whole device, which is effective to control the environment influence.

(4) In the invention, the blackened $Y_2O_3$ spray coating is formed, whereby the hardness is made higher than that of the white coating, which can contribute to the improvement of the abrasion resistance.

That is, according to the invention, the color of the $Y_2O_3$ spray coating is changed to form the black $Y_2O_3$ spray coating as a spray coating formed on the surface of the substrate in order to provide the aforementioned properties (1)-(4). An essential feature of the invention is as follows.

(1) A $Y_2O_3$ spray-coated member characterized by covering a surface of a substrate with a $Y_2O_3$ black spray coating.

(2) A $Y_2O_3$ spray-coated member characterized by disposing an undercoat made of a metal coating beneath a $Y_2O_3$ black spray coating.

(3) A $Y_2O_3$ spray-coated member characterized by disposing a middle layer between an undercoat made of a metal coating and a $Y_2O_3$ black spray coating as a top coat.

(4) A $Y_2O_3$ spray-coated member, characterized in that the undercoat is a metal coating made of at least one metal or alloy selected from Ni and its alloy, W and its alloy, Mo and its alloy, Ti and its alloy, Al and its alloy, and Mg alloy at a thickness of 50-500 μm.

(5) A $Y_2O_3$ spray-coated member, characterized in that the middle layer is made of a coating of $Al_2O_3$, a double oxide of $Al_2O_3$ and $Y_2O_3$, a solid solution or a mixture thereof.

(6) A $Y_2O_3$ spray-coated member, characterized in that the $Y_2O_3$ black spray coating is obtained by forming a $Y_2O_3$ re-molten layer having a thickness of less than 30 μm and a blackened $Y_2O_3$ layer on a surface of the $Y_2O_3$ spray coating.

(7) A $Y_2O_3$ spray-coated member, characterized in that the $Y_2O_3$ black spray coating is constituted with a layer in which $Y_2O_3$ particles blackened on an outer peripheral portion or an inside of $Y_2O_3$ particle constituting the spray coating are deposited to a thickness of about 50-2000 μm.

The above black-white $Y_2O_3$ spray coating or blackened $Y_2O_3$ spray coating can be produced by the following method.

(1) A method of producing a $Y_2O_3$ spray-coated member, characterized in that a white $Y_2O_3$ powdery material is plasma-sprayed directly on a surface of a substrate or on an undercoat applied onto the surface of the substrate in an inert gas atmosphere substantially containing no oxygen to form a $Y_2O_3$ black spray coating.

(2) A method of producing a $Y_2O_3$ spray-coating member, characterized in that a white $Y_2O_3$ powdery material is sprayed on a surface of a substrate to form a $Y_2O_3$ white spray coating and then a laser beam is irradiated to form a blackened $Y_2O_3$ layer on a surface of the $Y_2O_3$ white spray coating.

(3) A method of producing a $Y_2O_3$ spray-coated member, characterized in that a white $Y_2O_3$ powdery material is sprayed directly on a surface of a substrate or on an undercoat applied onto the surface of the substrate to form a $Y_2O_3$ white spray coating, and then an electron beam is irradiated under a reduced pressure or in an inert gas atmosphere under a reduced pressure to form a blackened $Y_2O_3$ layer on the surface of the $Y_2O_3$ white spray coating.

(4) A method of producing a $Y_2O_3$ spray-coated member, characterized in that the undercoat made of a metal coating is disposed beneath the $Y_2O_3$ black spray coating.

(5) A method of producing a $Y_2O_3$ spray-coated member, characterized in that a middle layer is disposed between the undercoat made of a metal coating and the $Y_2O_3$ black spray coating formed as a top coat.

(6) A method of producing a $Y_2O_3$ spray-coated member, characterized in that the inert gas atmosphere is an atmosphere under a low pressure of 50-600 hPa.

(7) A method of producing a $Y_2O_3$ spray-coated member, characterized in that the inert gas atmosphere includes an environment of a heat source for an atmosphere plasma spraying surrounded with a gas such as Ar, $N_2$ or the like so as not to penetrate air into the heat source.

(8) A method of producing a $Y_2O_3$ spray-coated member, characterized in that the middle layer is made of a coating of $Al_2O_3$, a double oxide of $Al_2O_3$ and $Y_2O_3$, a solid solution or a mixture thereof.

(9) A method of producing a $Y_2O_3$ spray-coated member, characterized in that the $Y_2O_3$ black spray coating is obtained by forming a $Y_2O_3$ re-molten layer having a thickness of less than 30 μm and a blackened $Y_2O_3$ layer on a surface of the $Y_2O_3$ spray coating.

(10) A method of producing a $Y_2O_3$ spray-coated member, characterized in that the $Y_2O_3$ black spray coating is constituted with a layer in which $Y_2O_3$ particles blackened on an outer peripheral portion or an inside of $Y_2O_3$ particle constituting the spray coating are deposited to a thickness of about 50-2000 μm.

As mentioned above, the blackened $Y_2O_3$ spray coating as an essential feature of the invention basically possesses various properties inherent to the conventional $Y_2O_3$ white spray coating. Therefore, it develops performances equal to or more than those of the white $Y_2O_3$ spray coating even under a clean working environment of semiconductors such as plasma treatment in an atmosphere containing a halogen or a halogen compound as a main application of the spray coating. Further, when the $Y_2O_3$ black spray coating is formed on a heat-transmitting face or a heat-receiving face, at least excellent heat transmission and heat receiving efficiency are developed as compared with the white $Y_2O_3$ spray coating and the working efficiency of the plasma etching is more improved.

Since the surface is a black coating (layer), it hardly shows dirt accompanied with the adhesion of colored particles generating on the way of the handling or under an environment thereof, and hence the existing wash number repeated more than needs can be reduced. Therefore, the device provided with the blackened coating can be expected to have effects that the maintenance and inspection are reduced or omitted, and the production efficiency is improved, and the cost of the product is decreased, and the service life of the members in the device accompanied with the washing through a chemical having a strong corrosion is prolonged, and the like.

Figure 1:
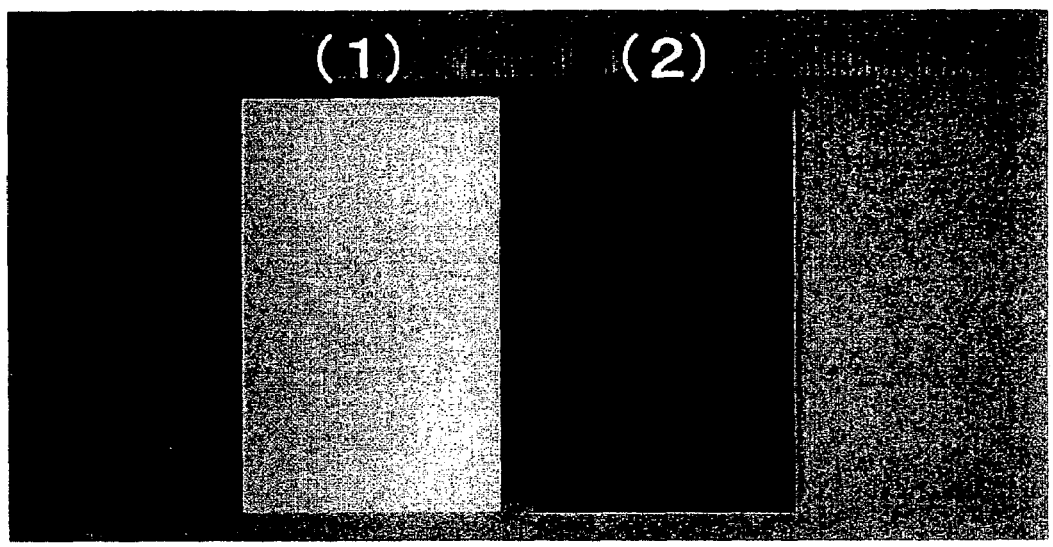
FIG. 1 is a view comparing appearances of white and black $Y_2O_3$ spray coatings, in which (1) is a $Y_2O_3$ white spray coating of the conventional technique (coating formed through a plasma spraying method by using white $Y_2O_3$ powdery material) and (2) is a $Y_2O_3$ black spray coating according to the invention ($Y_2O_3$ coating by forming a $Y_2O_3$ white spray coating from white $Y_2O_3$ powdery material through a plasma spraying method and blackening it through electron beam irradiation).

BEST MODE FOR CARRYING OUT THE INVENTION (1) Nature and, Properties of Blackened $Y_2O_3$ Spray Coating ($Y_2O_3$ Black Spray Coating)

The $Y_2O_3$ black spray coating as an essential feature of the invention is clearly different from the $Y_2O_3$ white spray coating in at least the appearance. As a result of X-ray diffraction of the blackened $Y_2O_3$ spray coating, it has been previously known that two crystal phases of cubic system and monoclinic system are detected in case of the $Y_2O_3$ white spray coating, while only the crystal phase of cubic system is observed in case of the black spray coating.

According to the inventors' studies, however, it is not thought that such a difference of the crystal phase only exerts on the blackening and whitening of $Y_2O_3$. As shown in FIG. 1 (photograph), the clear difference of both is seen at least in the appearance, so that "blackened $Y_2O_3$ spray coating" is said to be the $Y_2O_3$ black spray coating in the invention.

According to the inventors' experiments, it is considered that the blackening phenomenon of $Y_2O_3$ spray coating becomes remarkable in case of heating at a high temperature above melting point in an environment having a low oxygen partial pressure for a short time (rapid heating), which will be guessed from a fact that a part of oxygen constituting $Y_2O_3$ is lost. In this meaning, it is considered that the $Y_2O_3$ black spray coating if at a state of $Y_2O_{3-x}$ as a form of the compound.

The blackened $Y_2O_3$, i.e. the $Y_2O_3$ black spray coating taking $Y_2O_{3-x}$ is recognized to differ from the properties of the white $Y_2O_3$ spray coating formed by the plasma spraying method under an atmospheric pressure as follows.

(i) The surface of the $Y_2O_3$ black spray coating (which is the blackened $Y_2O_3$ spray coating, and has the same meaning below) is very smooth and good in the gloss, so that the commercial value of the coating is improved.

(ii) The $Y_2O_3$ black spray coating hardly shows dirt (e.g. finger pattern, fine black dusts and the like) as compared with the white spray coating, so that the maintenance is easy, which contributes to the improvement of the productivity.

(iii) Since the surface of the $Y_2O_3$ black spray coating is dense, the penetration of a corrosive gas component into the inside of the coating is controlled to improve the corrosion resistance to the substrate.

(iv) In the surface of the $Y_2O_3$ black spray coating, the hardness, abrasion resistance and the like are improved as compared with the $Y_2O_3$ spray coating formed by the plasma spraying method under an atmospheric pressure or the plasma spraying method under a low pressure because $Y_2O_3$ particles constituting the coating are melted to remarkably improve a bonding force between mutual particles.

(v) In the phenomena of the above items (iii) and (iv), $Y_2O_3$ particles at least existing in a depth of 30 µm from a surface layer of the $Y_2O_3$ black spray coating are bonded by re-melting or rendered into the blackened $Y_2O_3$ spray coating. In this case, a portion of so-called $Y_2O_3$ white spray coating other than the above is maintained at a porous state inherent to the plasma spray coating. Therefore, even if the $Y_2O_3$ black spray coating (layer) is subjected to a rapid change of an environmental temperature or a thermal shock, there is no breakage or peeling of the spray coating.

(vi) When the $Y_2O_3$ black spray coating is formed on the surface of the heating body, a remarkable far-infrared radiation action is developed, so that if such a body is placed in an atmosphere under a low pressure, it is useful as a coating for a radiation type heat source. Moreover, in case of this application, the effect is developed as the thickness of the coating becomes thinner.

(vii) The general physical and chemical properties of the $Y_2O_3$ black spray coating are substantially the same as those of the conventional white $Y_2O_3$ spray coating except for the change of color tone (change to black), so that they may be applied to applications as usual. For example, as one of the applications in the $Y_2O_3$ white spray coating, there is a member to be arranged in a vessel for plasma etching treatment in connection with the semiconductor production device. In general, the $Y_2O_3$ spray coating is known to develop an excellent resistance to plasma erosion under an environment for plasma treatment in an atmosphere containing various halogen gases. The $Y_2O_3$ black spray coating used in the invention shows considerably excellent performances when being used in such an application.

Concretely, the two kinds of the spray coatings are subjected to an irradiation experiment in a mixed gas of $CF_4$ 100 cm$^3$-Ar 1000 cm$^3$-$O_2$ 10 cm$^3$ under a condition of plasma irradiation power of 1300 W for 20 hours. As a result, there is caused a difference between these coatings as follows:

① depth lost by erosion on the surface of the white $Y_2O_3$ spray coating: 6.1-7.6 µm;

② depth lost by erosion on the surface of the black $Y_2O_3$ spray coating: 5.8-6.5 µm, from which it is clear that the $Y_2O_3$ black spray coating according to the invention is excellent in the resistance to plasma irradiation. Under such an environment, the coating component formed by plasma erosion becomes small particles as one cause of environmental pollution, so that the invention can expect to have an effect as a countermeasure for pollution.

Also, when the white and black $Y_2O_3$ spray coatings are subjected to an experiment by immersing in a 2N aqueous solution of NaOH (40° C.), they do not utterly erode and develop an excellent resistance to alkali.

In the invention, when the $Y_2O_3$ black spray coating is formed on the surface of the substrate, an undercoat may be previously formed on the surface of the substrate. In this case, it is preferable that the undercoat is formed at a thickness of 50-500 µm by using one or more metals or alloys selected from Ni and its alloy, W and its alloy, Mo and its alloy, Ti and its alloy, Al and its alloy, Mg alloy and so on. When the spray coating of the undercoat is thinner than 50 µm, the action and effect as the undercoat are weak, while when the thickness exceeds 500 µm, the coating effect is saturated and the increase of the production cost in the lamination work is undesirably caused.

The $Y_2O_3$ black spray coating formed directly on the surface of the substrate or through the undercoat or a middle layer as a top coat is formed by an oxygen-free plasma spraying, or by blackening the $Y_2O_3$ white spray coating through the irradiation of an electron beam or a laser beam, and may have a thickness of about 50-2000 µm inclusive of the blackened layer. When the thickness is less than 50 µm, the heat radiation performance as the black coating is obtained but the properties inherent to the coating such as heat resistance, heat insulation property, corrosion resistance, abrasion resistance and the like can not be developed sufficiently. While, when the thickness exceeds 2000 µm, the bonding force between mutual ceramic particles constituting the coating lowers to mechanically and easily break the coating and also the formation of the thick coating takes a long time to undesirably increase the production cost. Therefore, the thickness is preferable to be about 50-2000 µm.

The porosity of the $Y_2O_3$ black spray coating is about 0.2-5% in case of the coating formed by oxygen-free plasma spraying. This porosity is considerably small as compared with the porosity of 5-12% in the $Y_2O_3$ white spray coating obtained by the conventional atmosphere plasma spraying. Also, the surface of the $Y_2O_3$ spray coating blackened by subjecting the $Y_2O_3$ white spray coating to the electron beam or laser beam irradiation becomes at a non-pore state because it is locally and completely melted in the irradiation by heating above the melting point of $Y_2O_3$ (2683 K). However, when it is solidified by the subsequent cooling, cracks are caused by the shrinking phenomenon of the volume to form new pores and a fine cracks. The presence of the new pores is fairly small as compared with the porosity of the initial coating, and also it remains in the vicinity of the surface layer of the coating and does not largely grow into the inside of the coating. In general, it is experientially known that the resistance to thermal shock lowers in the coating having no pore, so that the $Y_2O_3$ black spray coating as a top coat is preferable to have a porosity of not more than about 5% inclusive of pores (0.1-1%) caused by solidification crack after the irradiation.

In the invention, a middle layer may be formed between the $Y_2O_3$ black spray coating formed as a top coat and the above undercoat (metal layer). As the middle layer may be a spray coating made of $Al_2O_3$ alone, a double oxide of $Al_2O_3$ and $Y_2O_3$, a solid solution or a mixture. The thickness of the middle layer is preferable to be about 50-1000 µm. When the thickness is less than 50 µm, the function as the middle layer is not sufficient, while when it exceeds 1000 µm, the mechanical strength of the coating lowers.

The above thicknesses are summarized as follows. However, these thicknesses are not said to be essential for obtaining the effect of the invention and are preferable examples.

| | |
|---|---|
| Undercoat (metal-alloy) | 50-500 µm |
| Middle layer ($Al_2O_3$, $Al_2O_3$ + $Y_2O_3$) | 50-1000 µm |
| Top coat (black $Y_2O_3$) | 50-2000 µm |

(2) Substrate Forming $Y_2O_3$ Black Spray Coating Thereon

In the invention, as the substrate forming the above $Y_2O_3$ black spray coating thereon can be used any raw materials such as Al and an alloy thereof, steels such as stainless steel, Ti and an alloy thereof, ceramic sintered body (e.g. oxide, nitride, boride, silicide, and a mixture thereof), quartz, glass, plastics and the like. Also, there can be used ones obtained by forming various deposition films or plated films on these raw materials. The coating may be formed directly on the surface of the raw material or through the undercoat or the middle layer.

(3) Structure of $Y_2O_3$ Black Spray Coating

The inventors think that the $Y_2O_3$ black spray coating takes the following structure. That is, there are a structure that the $Y_2O_3$ black spray coating is formed as an outermost layer covering the substrate (single layer of $Y_2O_3$ black spray coating), a structure that a metal undercoat is formed on the surface of the substrate and then the $Y_2O_3$ black spray coating is formed thereon in order to improve the adhesion property of the $Y_2O_3$ black spray coating to the substrate (two-layer structure coating), a structure that the middle layer made of $Al_2O_3$ or double oxide of $Al_2O_3$ and $Y_2O_3$, solid solution or a mixture thereof is formed on the above undercoat and the $Y_2O_3$ black spray coating is formed thereon (three-layer structure coating), and the like. If necessary, it is possible to take a structure that the amounts of both the $Al_2O_3$ and $Y_2O_3$ ceramic materials compounded in the middle layer of the three-layer structure coating are intentionally changed so as to make $Al_2O_3$ content toward the undercoat high and $Y_2O_3$ content toward the top coat high.

(4) Method of Forming $Y_2O_3$ Black Spray Coating

The $Y_2O_3$ black spray coating can be formed, for example, by the following methods.

(a) As the undercoat (metal-alloy), it is preferable to use an electric arc spraying method, a flame spraying method, a high-velocity flame spraying method, an atmosphere plasma spraying method, a plasma spraying method under a low pressure and an explosion spraying method.

(b) As the top coat (white $Y_2O_3$, black $Y_2O_3$), it is preferable to use an atmosphere plasma spraying method in case of the white coating and an oxygen-free plasma spraying method in case of the black coating.

(c) As to the middle layer ($Al_2O_3$, $Al_2O_3$+$Y_2O_3$), it is preferable to use an atmosphere plasma spraying method, an oxygen-free plasma spraying method and an explosion spraying method.

(5) Method of Blackening White $Y_2O_3$ Spray Coating

The $Y_2O_3$ powdery material for general spraying is white powder having a particle size adjusted to a range of 5-80 µm. When the usual atmosphere plasma spraying is carried out by using this white powder, the resulting spray coating becomes also white. On the contrary, according to the invention, there are adopted the following methods for preparing the $Y_2O_3$ spray coating blackened in an appearance or at a constant thickness of at least the surface of the coating as shown in FIG. 1 ($Y_2O_{3-x}$ spray coating).

(a) Plasma Spraying Method of White $Y_2O_3$ Powder in an Atmosphere Containing Substantially No Air (Oxygen) (Hereinafter Referred to as Oxygen-Free Plasma Spraying)

In this method, the white $Y_2O_3$ spraying powdery material is plasma-sprayed in an inert gas atmosphere such as Ar, He or the like, whereby a blackened spray coating is obtained. According to this method, only a surface layer portion of $Y_2O_3$ particles constituting the spray coating is changed into black color, and a central portion of the particle is still at a white state. Particularly, such a phenomenon is remarkable in the $Y_2O_3$ spraying material having a large particle size, and also the particles having a small particle size (less than 5 µm) are blackened up to a central portion of the particle, so that it is considered that the change of the $Y_2O_3$ powdery spraying material into black is caused from the surface and propagated to the inside in accordance with the lapse of the treating time (spraying time).

Moreover, this plasma spraying method may be under an atmospheric pressure in case of the inert gas atmosphere such as Ar, He or the like, but is preferable to be carried out under a low pressure of 50-600 hPa, which is effective to form the blackened $Y_2O_3$ spray coating. Even in the atmosphere plasma spraying method, the similar effect can be expected if the incorporation of air into a heat source is prevented by flowing the inert gas such as Ar, He or the like around the spraying heat source.

When the white $Y_2O_3$ powdery material is subjected to a plasma spraying in an inert gas of a low pressure containing substantially no oxygen or in an atmosphere having a small oxygen partial pressure, the reason why the black $Y_2O_3$ spray coating is formed by the irradiation in such a spraying atmosphere is considered due to the facts that the $Y_2O_3$ powder is melted by heating in the plasma heat source at the small partial oxygen pressure and hence the chemical activity becomes strong and $Y_2O_3$ is easily decomposed by releasing oxygen therefrom, and that a greater number of electrons having a strong reducing property are produced in the plasma jet as a spraying heat source and constitute a high temperature environment to form a condition easily causing the chemical reaction and hence a part of oxygen is released on the surface of the white $Y_2O_3$ particles to change into a yttrium oxide represented by a molecular equation such as $Y_2O_{3-x}$, and the like.

The inventors have further thought that $Y_2O_3$ itself has a nature of easily releasing oxygen under the above spraying environment. For example, in case of the white $Al_2O_3$ powder, the blackening is not caused even by plasma spraying in the inert gas atmosphere (the formation of a slight ivory color is only recognized). Therefore, the inventors have considered that the absence or presence of oxygen release and the color change of the appearance are raised by the strength of chemical bonding force between each metal element and oxygen.

(b) Method of Irradiating Electron Beams to $Y_2O_3$ White Spray Coating Formed by the Atmosphere Plasma Spraying Method in an Inert Gas Atmosphere Under a Low Pressure.

This method is a method wherein electron beams are irradiated to the $Y_2O_3$ white spray coating formed by the usual atmosphere plasma spraying in Ar gas of 10-0.005 Pa to change only a surface layer portion of the spray coating into black. According to this method, the blackened surface layer portion of $Y_2O_3$ particles are locally melted by the electron beam, so that the coating tends to be smoothened over the whole thereof. Also, the melting portion of the spray coating and the depth of the blackened portion are gradually extended to the inner layer by superimposing the irradiation output of the electron beam and the irradiation number, so that they can be controlled by adjustment and are practically adaptable for the object of the invention when the depth is about 30 μm.

As the condition of the electron beam irradiation are recommended the following conditions:

| Irradiation atmosphere: | 10-0.005 Pa |
|---|---|
| Irradiation output: | 10-30 Kev |
| Irradiation rate: | 1-20 mm/s |
| Irradiation number: | 1-100 times (continuous or discontinuous) |

Moreover, when using a strong electron gun as mentioned in the following examples, the conditions is not necessarily limited to only the above condition.

(c) Method of Irradiating Laser Beam to $Y_2O_3$ White Spray Coating Formed by the Atmosphere Plasma Spraying Method This method is a method wherein a laser beam is irradiated to the $Y_2O_3$ white spray coating formed by the usual atmosphere plasma spraying in air or under a vacuum to change the coating into black. According to this method, a long time is required for blackening the whole of the spray coating having a wide area, but the method is preferable for blackening only a local portion of the spray coating.

Moreover, the irradiation method of the laser beam may be conducted in any one of vacuum, inert gas and air, and has a merit that the laser can be irradiated to the $Y_2O_3$ white spray coating without being influenced by the irradiation atmosphere. However, the laser beam is high in the reflectance ratio of the light to the white face and the treating ability lowers, so that according to the invention, the laser beam irradiation is suitable for the $Y_2O_3$ black spray coating obtained by plasma spraying in an argon gas containing substantially no oxygen under a low pressure. When the laser beam is irradiated to the $Y_2O_3$ white spray coating, it is effective that fine powder of carbon particles is scattered on the $Y_2O_3$ spraying face to improve the absorption efficiency of the light.

Even in this treatment, it is considered that $Y_2O_3$ particles are melted on the surface of the $Y_2O_3$ white spray coating irradiated by the laser beam and release oxygen to change into black $Y_2O_{3-x}$.

As the condition of the $CO_2$ or YAG laser beam irradiation, the followings are recommended:

| Laser output | 2-4 kW |
|---|---|
| Beam area: | 5-10 mm$^2$ |
| Beam scanning rate: | 5-20 mm/s |

In the invention, the desired $Y_2O_3$ black spray coating can be obtained by properly combining the aforementioned methods of forming the $Y_2O_3$ black spray coating (e.g. combination of method (a) and method (b), combination of method (a) and method (c) and the like).

EXAMPLES

Example 1

In this example, $Y_2O_3$ white spray coating through the conventional technique and $Y_2O_3$ black spray coating suitable for the invention (thickness 50 μm) are formed on a surface of a protection tube made of a quartz glass and provided with an electric heating wire, respectively, and then current is flowed into the electric heating wire to measure a wavelength released from the surface of each of the coatings. As a result, the wavelength is about 0.2-1 μm in case of the $Y_2O_3$ white spray coating, while it is 0.3-5 μm in case of the $Y_2O_3$ black spray coating and the release of an infrared ray is observed, and hence the difference in the efficiency as a heater is recognized.

Also, when the $Y_2O_3$ black spray coating (thickness 50 μm) is formed on a surface of a halogen lamp (high-brightness lamp) instead of the quartz heater, the wavelength after the formation of the $Y_2O_3$ black spray coating is more than 0.3-10 μm as compared with the case that the wavelength in the lamp having no coating is 0.2-3 μm, and it is used in a far-infrared zone and the improvement of the efficiency as a heater is clear. Moreover, the wavelength after the formation of the $Y_2O_3$ white spray coating through the conventional technique is equal to or smaller than that having no spray coating.

Example 2

In this example, a spray coating of 80 mass % Ni-20 mass % Cr alloy (thickness 100 μm) is formed on one-side surface of a substrate of SUS 304 stainless steel (size: width 50 mm×length 50 mm×thickness 3.5 mm) by an atmosphere plasma spraying as an undercoat, and thereafter a commercially available $Y_2O_3$ white powdery spraying material is used to form a $Y_2O_3$ white spray coating by an atmosphere plasma spraying method of the conventional technique or a $Y_2O_3$ black spray coating by an oxygen free plasma spraying method adaptable for the invention at a thickness of 250 μm, respectively. In this way, three specimens of the spray coating are prepared with respect to one condition.

With respect to these specimens, the properties of white and black $Y_2O_3$ spray coatings are compared by measuring the appearance and porosity of the $Y_2O_3$ top coat at a section of the coating through an optical microscope and an image analyzing device and conducting a thermal shock test and measuring an adhesion strength of the top coat and a micro-Vicker's hardness of the top coat surface.

In Table 1 are shown the above test results. Moreover, the production conditions of the coating and test method and condition are described below the table.

Further, the micro-hardness of the coating surface is clearly higher than that of the $Y_2O_3$ white spray coating of the conventional technique, which shows that the resistance to blast erosion is improved.

There is used the following device for the irradiation of electron beam:

Rated output of electron gun: 6 kW

| | |
|---|---|
| Acceleration voltage: | 30-60 kV |
| Beam current: | 5-100 mA |
| Beam diameter: | 400-1000 μm |
| Irradiation atmosphere: | from 6.7 to 0.27 Pa |
| Irradiation distance: | 300-400 mm |

Example 3

In this example, the abrasion resistance of $Y_2O_3$ black spray coating as a top coat is examined by using the specimens of Example 2. The test device and test conditions used are as follows.

Test method: adopts a reciprocating movement abrasion test method defined in a test method for abrasion resistance of a plated film according to JIS H8503.

TABLE 1

| | | Treatment after coating formation | | | | | | | |
|---|---|---|---|---|---|---|---|---|---|
| No | Spraying method | Electron beam treatment | Laser beam treatment | Color of coating | Porosity of coating % | Thermal Shock test | Adhesion strength MPa | Vicker's Hardness mHV | Remarks |
| 1 | Atmosphere plasma spraying | None | None | White | 5~12 | No peeling | 38~41 | 437~445 | Comparative example |
| 2 | | Presence | None | Black | 0.1~0.5 | No peeling | 40~43 | 520~541 | Invention example |
| 3 | | None | Presence | Black | 0.1~0.3 | No peeling | 41~43 | 515~535 | |
| 4 | Oxygen free plasma spraying | None | None | Black | 0.4~0.6 | No peeling | 40~44 | 533~551 | |
| 5 | Oxygen free plasma spraying | None | None | Black | 0.5~0.8 | No peeling | 41~44 | 522~547 | |

(Note)
(1) Three specimens are prepared per one condition. Ar pressure in No. 4 is 1012 hPa, and Ar pressure in No. 5 is 100 hPa.
(2) Undercoat (80Ni-20Cr) of 100 μm, white or black $Y_2O_3$ of 250 μm as a top coat.
(3) Porosity of coating is measured at a section of the coating.
(4) Adhesion property of coating is measured according to a test method of adhesion strength defined in a ceramic spraying test method of JIS H8666.
(5) Thermal shock test: repeat of 350° C. × 15 min → room temperature (cooling); observation of appearance after 10 times.

As seen from the results of Table 1, all of the spray coatings adaptable for the invention (Nos. 2-5) indicate black color and have performances such as resistance to thermal shock, adhesion strength and the like equal to those of the $Y_2O_3$ white spray coating of the comparative example (No. 1). Also, the porosity of the coating is confirmed to be more dense in the coatings of the invention. This is considered due to the fact that $Y_2O_3$ particles on the surface of the coating are melted by irradiating the electron beam (No. 2) or the laser beam (No. 3). However, the surface of the coating becomes not completely non-pore state because there is recognized a tendency that fine new "cracks" are caused in the cooling solidification after the melting of $Y_2O_3$ particles.

Test conditions: load 3.5N, reciprocating rate 40 times/min, 10 minutes (400 times), 20 minutes (800 times), abrasion area 30×12 mm, abrasion paper CC320

The evaluation is conducted by measuring the weight of the specimen before and after the test and quantifying an abrasion quantity from the weight difference.

The test results are shown in Table 2. As seen from the results of Table 2, the abrasion quantity of the $Y_2O_3$ black spray coating having a hard coating surface (Nos. 2-5) corresponds to 50-60% of that of the $Y_2O_3$ white spray coating of the comparative example, which shows an excellent abrasion resistance. This results include the smoothening of the coating surface by the blackening treatment.

TABLE 2

| No | Spraying method | Treatment after coating formation | | Color of coating | Porosity of coating % | Quantity of weight reduced by abrasion test (mg) | | Remarks |
|---|---|---|---|---|---|---|---|---|
| | | Electron beam treatment | Laser beam treatment | | | After 400 times | After 800 times | |
| 1 | Atmosphere plasma spraying | None | None | White | 5~12 | 25~28 | 53~70 | Comparative example |
| 2 | | Presence | None | Black | 0.1~0.5 | 15~17 | 31~35 | Invention example |
| 3 | | None | Presence | Black | 0.1~0.3 | 14~18 | 30~33 | |
| 4 | Oxygen free plasma spraying | None | None | Black | 0.4~0.6 | 12~16 | 35~37 | |
| 5 | Oxygen free plasma spraying | None | None | Black | 0.5~0.8 | 13~15 | 34~35 | |

(Note)
(1) Three specimens are prepared per one condition. Ar pressure in No. 4 is 1012 hPa, and Ar pressure in No. 5 is 100 hPa.
(2) Undercoat (80Ni-20Cr) of 100 μm, white or black $Y_2O_3$ of 250 μm as a top coat.
(3) Porosity of coating is measured at a section of the coating.
(4) Test for abrasion resistance of coating is carried out by a reciprocating movement abrasion test method defined in a test method for abrasion resistance of a plated film according to JIS H8503.

INDUSTRIAL APPLICABILITY

The products according to the invention ($Y_2O_3$ black spray-coated members) are excellent in the heat radiation property and resistance to damaging and hardly shows dirt when it is applied to applications for the conventional $Y_2O_3$ white spray-coated products. Concretely, they are applicable as a surface treating technique of members such as deposhield, baffle plate, focus ring, insulator ring, shield ring, bellows cover, electrodes, which are subjected to a plasma treatment with a treating gas containing a halogen or a compound thereof, but also a metal fusion crucible utilizing a resistance to metal melting. Further, the invention is preferably used in a field of heater tube for heating, infrared and far infrared radiation members and so on.

The invention claimed is:

1. A $Y_2O_3$ spray-coated member characterized by covering a surface of a substrate with a $Y_2O_3$ black spray coating, wherein the $Y_2O_3$ black spray coating is generated by an electron beam process.

2. A $Y_2O_3$ spray-coated member according to claim 1, wherein an undercoat made of a metal coating is disposed beneath a $Y_2O_3$ black spray coating.

3. A $Y_2O_3$ spray-coated member according to claim 2, wherein a middle layer is disposed between an undercoat made of a metal coating and a $Y_2O_3$ black spray coating as a top coat.

4. A $Y_2O_3$ spray-coated member according to claim 2, wherein the undercoat is a metal coating made of at least one metal or alloy selected from Ni and its alloy, W and its alloy, Mo and its alloy, Ti and its alloy, Al and its alloy, and Mg alloy at a thickness of 50-500 μm.

5. A $Y_2O_3$ spray-coated member according to claim 3, wherein the middle layer is made of a coating of $Al_2O_3$, a double oxide of $Al_2O_3$ and $Y_2O_3$, a solid solution or a mixture thereof.

6. A $Y_2O_3$ spray-coated member according to claim 1, wherein the $Y_2O_3$ black spray coating is obtained by forming a $Y_2O_3$ re-molten layer having a thickness of less than 30 μm and a blackened $Y_2O_3$ layer on a surface of the $Y_2O_3$ spray coating.

7. A $Y_2O_3$ spray-coated member according to claim 1, wherein the $Y_2O_3$ black spray coating is constituted with a layer in which $Y_2O_3$ particles blackened on an outer peripheral portion or an inside of $Y_2O_3$ particle constituting the spray coating are deposited to a thickness of about 50-2000 μm.

8. A method of producing a $Y_2O_3$ spray-coated member, characterized in that a white $Y_2O_3$ powdery material is sprayed directly on a surface of a substrate or on an undercoat applied onto the surface of the substrate to form a $Y_2O_3$ white spray coating, and then an electron beam is irradiated under a low pressure or in an inert gas atmosphere under a low pressure to form a blackened $Y_2O_3$ layer on the surface of the $Y_2O_3$ white spray coating.

9. A method of producing a $Y_2O_3$ spray-coated member according to claim 8, wherein the undercoat made of a metal coating is disposed beneath the $Y_2O_3$ black spray coating.

10. A method of producing a $Y_2O_3$ spray-coated member according to claim 8, wherein a middle layer is disposed between the undercoat made of a metal coating and the $Y_2O_3$ black spray coating formed as a top coat.

11. A method of producing a $Y_2O_3$ spray-coated member according to claim 8, wherein the inert gas atmosphere is an atmosphere under a low pressure of 50-600 hPa.

12. A method of producing a $Y_2O_3$ spray-coated member according to claim 8, wherein the inert gas atmosphere includes an environment of a heat source for an atmosphere plasma spraying surrounded with a gas such as Ar, $N_2$ or the like so as not to penetrate air into the heat source.

13. A method of producing a $Y_2O_3$ spray-coated member according to claim 10, wherein the middle layer is made of a coating of $Al_2O_3$, a double oxide of $Al_2O_3$ and $Y_2O_3$, a solid solution or a mixture thereof.

14. A method of producing a $Y_2O_3$ spray-coated member according to claim 8, wherein the $Y_2O_3$ black spray coating is obtained by forming a $Y_2O_3$ re-molten layer having a thickness of less than 30 μm and a blackened $Y_2O_3$ layer on a surface of the $Y_2O_3$ spray coating.

15. A method of producing a $Y_2O_3$ spray-coated member according to claim 8, wherein the $Y_2O_3$ black spray coating is constituted with a layer in which $Y_2O_3$ particles blackened on an outer peripheral portion or an inside of $Y_2O_3$ particle constituting the spray coating are deposited to a thickness of about 50-2000 μm.

* * * * *